United States Patent

Kracklauer

[15] 3,655,049
[45] Apr. 11, 1972

[54] METHOD AND APPARATUS FOR RETAINING AND DISLODGING FILTER CAKE

[72] Inventor: Aloysius C. Kracklauer, Conroe, Tex.
[73] Assignee: Sparkler Manufacturing Company, Conroe, Tex.
[22] Filed: Nov. 19, 1970
[21] Appl. No.: 91,097

[52] U.S. Cl. .............................. 210/81, 210/333, 210/388, 210/DIG. 18
[51] Int. Cl. ....................................... B01d 25/34
[58] Field of Search .............. 210/DIG. 18, 388, 81, 82, 331, 210/327, 333, 332

[56] References Cited

UNITED STATES PATENTS 3,447,690  6/1969  Kracklauer ..................... 210/388 X Primary Examiner—Jim DeCesare
Attorney—Arnold, White & Durkee, Tom Arnold, Robert A. White, Bill Durkee, Frank S. Vanden, III, Louis T. Pirkey and John F. Lynch

[57] ABSTRACT

A porous screen fitted adjacent a vertical plate filter, in close proximity therewith, and means for oscillating or agitating the screen are provided, so that the screen acts to dislodge the filter cake which builds up on the filter plate. A method of dislodging a filter cake is provided which includes oscillation of a screen located adjacent a vertical plate filter having filtering media thereon for filtering fluids, and then continued oscillation of the screen while at the same time expanding the filtering media toward the screen and washing the filtering media with water.

8 Claims, 5 Drawing Figures

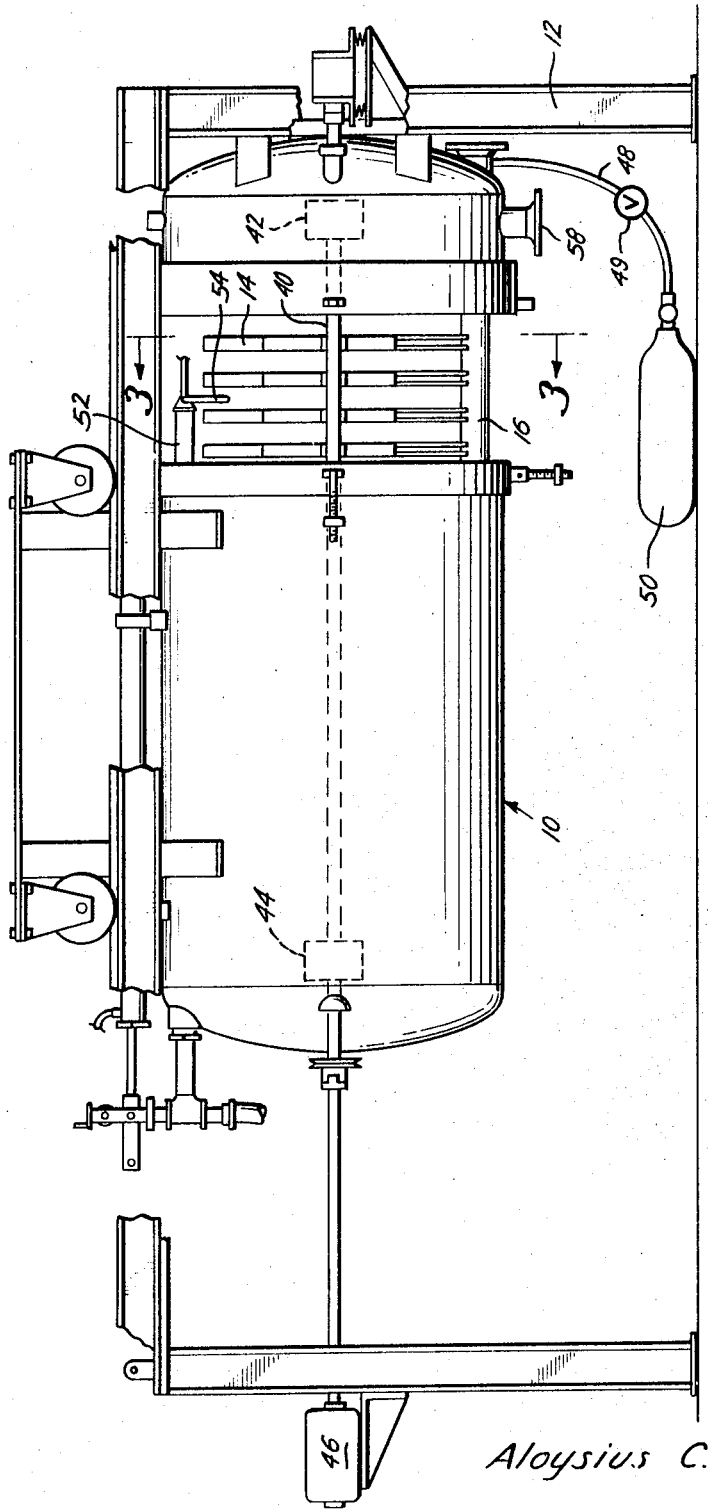

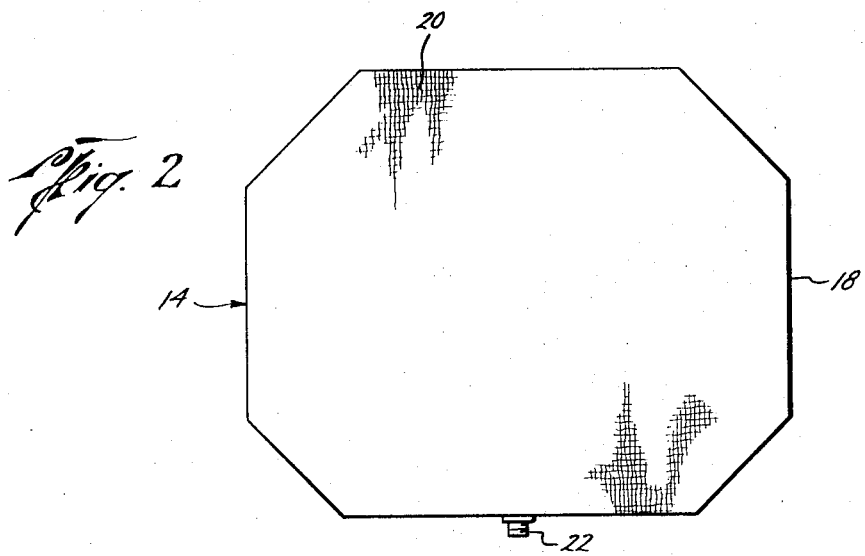
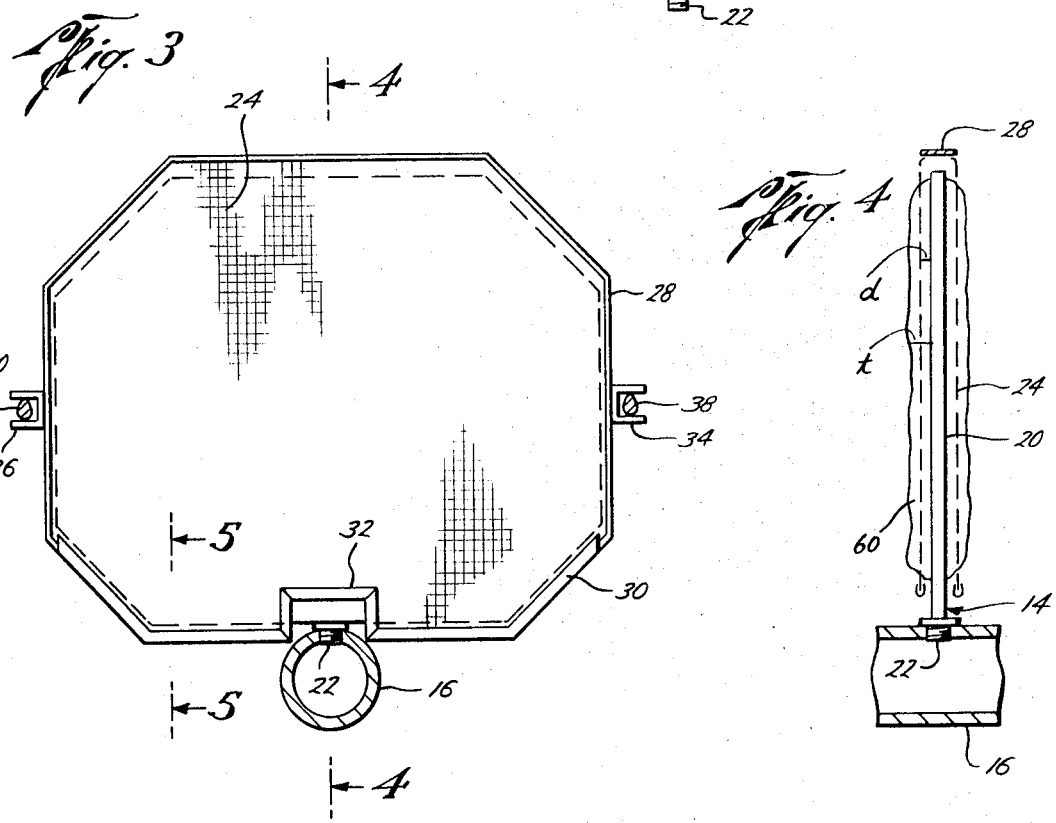
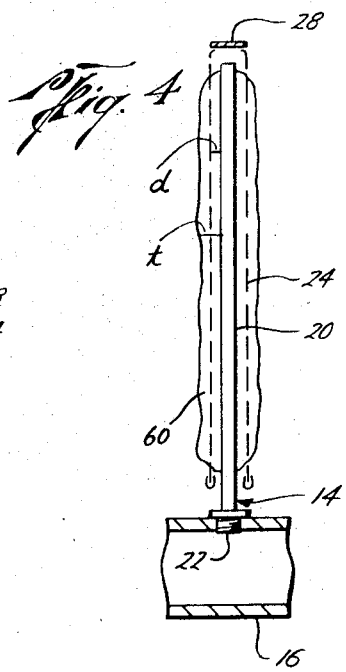
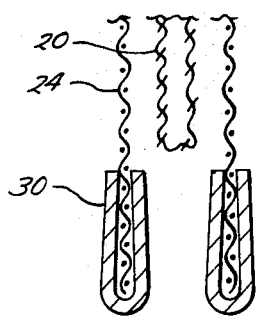

METHOD AND APPARATUS FOR RETAINING AND DISLODGING FILTER CAKE

BACKGROUND OF THE INVENTION

Vertical plate filters, such as the type shown in my prior U.S. Pat. No. 3,344,922 have found wide acceptance in the industrial filtration art. Although the use of filters of this type has resulted in significant advantages and economies for the filter user, some problems have arisen which have curtailed or hampered use of these filters in certain contexts use.

One problems with filters of this type has been the tendency of heavy filter cakes to crack or slip during the filtering cycle due to pressure fluctuation or external vibrations, thereby causing cloudiness in the filtrate and necessitating an interruption in the filter cycle to recirculate for clarity, or even shutting the filter down completely.

Another problem with filters of this type has been the tendency of thicker or heavier filter cake to crack or slip off at the end of the filter cycle while the residue liquid is being drained from the filter tank, and during the process of leaching out the cake or drying the filter cake by means of air or other gases.

It would be desirable if apparatus could be provided which would aid in retaining such a filter cake on the filter plate, until such time as it is desired to remove the filter cake. Such apparatus is provided by the present invention.

Another problem with filters of this type has been the difficulty in many contexts of use, of removing the filter cake when desired. If the filter cake is not substantially entirely removed from the filtering media of the filter plate, then it will clog the filtering media and the filtering process will not be nearly so efficient. It is therefore desirable that the filter cake be substantially completely removed prior to start-up of the filtration process. A typical procedure is to allow buildup of the filter cake on the filter plate to a desired level, terminate filtration and drain the fluid to be filtered from the tank — and then to clean the filter plates in the best possible manner. Heretofore, no method and/or apparatus has been available which could be effectively utilized to achieve maximum cleaning efficiency in many instances. Further, prior art methods otherwise useful have tended to require excessive amounts of time, which has rendered the filtration process less efficient.

The present invention provides such method and apparatus, and makes it possible to quickly and efficiently dislodge the filter cake from the filter plate at the desired moment, and further makes it possible to achieve rapid and complete cleaning of the filtering media following initial dislodgement of the bulk of the filter cake.

SUMMARY OF THE INVENTION

In summary, the invention comprises apparatus by which a filter cake may be retained on a vertical filter plate having flexible filtering media thereon for filtering fluids, until it is desired to dislodge the cake, and by which the cake may be readily dislodged at the desired time. The invention further provides a method for dislodging a filter cake.

The apparatus comprises a porous retaining means for positioning adjacent a filter plate, such as a screen of expanded metal, desirably of a size and configuration such that the screen covers substantially the entire effective area of filtration of the filter plate, and means for oscillating or agitating said screen. The apparatus further desirably includes means for expanding the filtering media on the filter plate outwardly into proximity or engagement with the screen, and fluid means for washing the filtering media.

The method of the invention generally comprises oscillation of the porous retaining means following termination of the filtering process after buildup of the filter cake to the desired level. The method further contemplates in another embodiment, continued oscillation of the retaining means while at the same time expanding the filtering media outwardly toward the screen and washing of the filtering media by means of a stream of water or other suitable cleaning fluid.

BRIEF DESCRIPTION OF THE DRAWINGS

A preferred embodiment of the invention is illustrated in the accompanying drawings which form a part of this specification, and wherein:

FIG. 1 is an elevational view, partially in section, of a filter tank having therein apparatus constructed in accordance with the present invention;

FIG. 2 is a front view of a filter plate useful in connection with the present invention;

FIG. 3 is a front view of apparatus useful in conjunction with the filter plate of FIG. 2, in accordance with the invention, taken along the line 3 — 3 of FIG. 1;

FIG. 4 is a view taken along the line 4 — 4 of FIG. 3;

FIGS. 5 is a view taken along the line 5 — 5 of FIG. 3.

DETAILED DESCRIPTION OF PREFERRED EMBODIMENT

Referring now in more detail to FIGS. 1 – 4, there is illustrated a filter tank 10 supported by suitable means such as the frame support 12. More complete disclosure of a suitable filter tank in connection with which the present invention may be employed, may be obtained from prior art patents such as my prior U.S. Pat. No. 3,344,922.

Disposed in the filter tank 10 are any suitable number of vertical filter plates 14, through which the fluid to be filtered is passed whereupon filtration of the fluid occurs. The filtrate then passes from the interior of the filter plates 14 into the outlet manifold 16, through which it is removed from the filter tank 10.

As is well known in the art, the filter plates 14 are provided with a flexible filtering media such as a filter cloth 20 which defines the surfaces of the plates 14, and through which the fluid to be filtered must pass to obtain access to the interior portions of a filter plate 14. Pressure differential in the tank 10 promotes passage of the fluid in this manner. As the fluid in the tank 10 is passed through the filter plates 14, a filter cake is built up on the exterior of the filtering media. In accordance with the present invention, means is provided for retaining a thick and heavy cake on the filter plate until such time as it is desired to remove the cake, while at the same time providing for quick and efficient dislodging of the cake at the desired time.

The present invention also provides a method for quick and efficient dislodging of the filter cake and cleaning of the filtering media, when it is desired to terminate the filtering cycle and clean the media for fresh filtration operations.

Means for accomplishing the above stated purposes of this invention conveniently take the form, as illustrated in this preferred embodiment of the invention, of porous retaining means such as the screen 24 which fits closely over the filter plate, and means for agitating the screen 24, when desired.

In FIG. 2 there is illustrated a typical filter plate which may be utilized in connection with the present invention, the filter plate 14 comprising a frame 18 and a flexible but taut filter cloth 20 on each major face thereof. A suitable outlet connection 22 is included for establishing fluid communication between the interior of the plate 14 and the outlet manifold 16.

In FIG. 3, apparatus constructed in accordance with the invention is shown in operable position over filter plate 14, said apparatus generally comprising porous retaining means for positioning adjacent the filter media to retain a heavy filter cake thereon, in combination with means for agitating said porous retaining means at the desired times effective to dislodge the cake. In accordance with this embodiment of the invention, such means include a screen 24 retained in a suitable encasing frame which in this embodiment includes an upper frame portion 28 and a lower frame portion 30. The exact shape or nature of the frame structure is not generally critical to the operability of the invention, but it is desired that the frame be of a convenient size for fitting over the filter plate 14 in a manner such that substantially the full effective filtration area of the filtering media is covered by the screen 24.

As will be apparent from FIGS. 3 and 4, the screens 24 and associated frames may be slipped into position over the filter plates 14 after the latter are already in place in the filter tank. This is an important feature since it enables units to be provided which do not entail special construction of the filter plate or other special and costly connections.

The screen 24 is desirably constructed of flattened expanded metal. Other suitable types of strong porous screen, such as a wire mesh, may also be suitable for use in other embodiments of the invention. In still other embodiments of the invention, a series of wires such as thin metal wires, may be stretched between the opposing frame members, and such wire arrangement may be used in lieu of expanded metal or wire mesh, etc. For example, parallel wires may be stretched between the upper frame portion 28 and the lower frame portion 30, the wires being desirably vertically oriented although they might be oriented in other directions. [Some adjustment of the cam means may be desirable depending on the orientation of the wires; e.g., brackets 34, 36 may be set to open vertically when it is desired to achieve lateral rather than vertical vibration.] Such wires would desirably be spaced approximately 1 inch apart to give substantially full coverage across the filtering media. Screws or other fastening means may desirably be located on at least one of the upper or lower portions of the frame so that the wires might be tightened as desired by winding around such fastening means.

The prime advantage of a wire arrangement such as discussed above in preference to expanded metal or wire mesh, for example, would be the ability to keep the wires taut by continued stretching of the wires; wire mesh or other screens, on the other hand, may tend to sag in the middle of the plate after a certain amount of use thereby reducing their useful life in connection with accomplishing the purpose of the invention. Also, the wire arrangement may be more economical to build than the expanded metal or mesh arrangement. Further, the wire arrangement may facilitate cleansing of the filtering media by direction of a fluid cleansing stream against the filtering media after completion of a filtration operation. A wire arrangement of this type effectively forms a screen whether or not cross-wires are utilized, and such arrangement is included within the meaning of the term "screen means" as used herein.

The frame 28, 30 has a C-shaped or bracket shaped indention 32 at the lower central portion thereof, around the outlet connection 22 to the manifold 16. In this embodiment of the invention, the screen 24 is spot-welded to the upper frame portion 28. The lower frame portion 30 is in the form of a channel, as illustrated in FIG. 5, and the two arms of the channel fit tightly around the screen 24.

Affixed to the frame are means for receipt of motive means which act to agitate the frame, and hence the screen 24, when desired. Thus, securely affixed to the frame, on opposite sides thereof and horizontally aligned one with each other, are shaker brackets or lugs 34 and 36 which in this embodiment are in the form of outwardly opening brackets, welded to the upper frame portion 28. Operably connected to these brackets are suitable motive means, which in this embodiment comprise the longitudinal rods 38 and 40 which are eccentric in cross-section to provide a cam action.

The frame is positioned around the filter plate 14 in such a manner that the screen 24 is spaced horizontally on each side of the filter cloth 20, a distance d from the surface thereof. The distance d should be less than the anticipated thickness t of the filter cake 60 which will build up on the surface of the filter cloth during the filtration process.

Eccentric rods 38 and 40 are positioned in the shaker brackets 34 and 36, respectively, and upon rotation of these rods the shaker brackets, and hence the frame and screen 24, are subjected to an up-and-down movement and at the same time a slight lateral vibration. Eccentric rod 40 is retained within the tank 10 by a couple of sleeve bearings 42 and 44 desirably positioned near the front and rear of the tank 10, and the rod 38 is desirably retained in similar bearings, of any suitable construction. Rods 38 and 40 are rotated by suitable power means such as the electric motor 46, which is located on the exterior of the filter tank 10.

In combination with the apparatus described above, other apparatus is desirably employed in connection with the present invention; thus, operably connected with the outlet manifold 16 through line 48 and suitable flow control means such as the valve 49, is a source of compressed air or other suitable gas, such as the tank 50. Also, disposed above the plates 14 within the tank 10, is a horizontally disposed pipe 52 positioned desirably centrally along the tank 10 parallel to the outlet manifold 16. The pipe 52 is provided with one or more downwardly directed nozzles 54 from which water or other suitable fluid may be ejected against the filter cake which builds up on the filter plates 14. The pipe 52 is connected in fluid communication with a suitable source of fluid under pressure such as a suitable water line from the exterior of the tank 10.

Filtrate may be drained from the tank from the outlet manifold 16, through the drain 58.

In accordance with the operation of the process of the present invention, fluid in the tank 10 is filtered through the filter plates 14 in the customary manner, until a filter cake builds up on the filter cloths 20 sufficiently such that the thickness t of the filter cake is greater than the distance d between the plate 14 and the screen 24, as shown in FIG. 4. Then the fluid is drained from the tank through the opening 58, and the filter cake is dislodged from the filter plates 14 in accordance with the present invention.

Dislodging of the filter cake is accomplished by first actuating the motor 46 to synchronously rotate the eccentric bars 38 and 40 (desirably at about 600 to 900 revolutions per minute), to thereby oscillate the frame 28, 30 and the screen 24. This process will quickly dislodge the greatest part of the filter cake 60.

The filter cloths may then be effectively cleaned in a manner heretofore impractical or impossible, by continuing oscillation of the screen 24 in the manner mentioned above, while at the same time inflating the filter cloths 20 to thereby force the filter cloths into closer proximity or engagement with the screens 24, by introducing compressed air from the tank 50 through the valve 49 and line 48, into the outlet manifold 16 and thence into the interior of the filter plates 14. Still better cleaning may be desirably accomplished if, while at the same time the filter cloths are thus inflated and oscillation of the screens is continued, water under pressure is ejected onto the filter cloths from the overhead nozzles 54. It is found that simultaneous action of the cleaning water from nozzles 54, oscillation of the screen, and pressure of the filter cloths 20 against the moving screens as by the use of compressed air, results in a very complete cleaning of the filter cloths which leaves them rejuvinated for more efficient filtering of subsequent fluid. At the same time, experimental tests have shown that no damage to the filter cloths results from the application of the process as outlined above.

The tests have indicated that the above-mentioned process is extremely efficient at dislodging of the filter cake. The tests have also shown that the use of the apparatus illustrated and described above promotes retention of the filter cake on the filter plates to a remarkable extent not heretofore obtainable with such simple and economical apparatus. It has been found that the screen 24 will hold the cake very tenaciously on the vertical plate 14 even if the cake is wet, and even if the cake is very thick and heavy.

Instead of using the filter cloths 20, other suitable filtering media might be used. If the filtering media is quite porous, such as a wire mesh, then it may be desirable to utilize in connection therewith a less porous backing sheet to facilitate expansion of the filtering media out toward the porous retaining means, upon introduction of air or other compressed gas into the center of the filter plate.

Although the invention has been described in terms of particular embodiments, which represent the best mode known to the applicant at the time of this application, it will be apparent that changes may be made in the structures and methods disclosed without departing from the scope of the invention which is defined by the following claims.

What I claim is:

1. Apparatus for use in filtering fluids comprising in combination with a filter tank and at least one vertical filter plate positioned in said tank:

porous retaining means adjacent said filter plate, said retaining means covering substantially the complete effective filtration area of said filter plate, and said retaining means being laterally spaced from the surface of said filter plate by a distance which is less than the thickness of the filter cake which builds up on said surface of said filter plate;

means on said retaining means for receipt of oscillating means; and oscillating means which may be selectively oscillated when desired to oscillate said retaining means;

said retaining means being effective upon oscillation to dislodge filter cake from said filter plate, but being effective at other times to retain filter cake on said filter plate.

2. Apparatus in accordance with claim 1, wherein said retaining means comprises a frame and an expanded metal screen affixed to said frame around the periphery thereof, and wherein said means for receipt of said oscillating means comprises bracket members affixed to each side of said frame.

3. Apparatus in accordance with claim 1, wherein said oscillating means comprise eccentric longitudinal rods driven by motive means.

4. Apparatus for use in filtering fluids comprising in combination with a filter tank and at least one vertical filter plate positioned in said tank:

porous screen means adjacent said filter plate, said screen means covering substantially the complete effective filtration area of said filter plate, and said screen being laterally spaced from the surface of said filter plate by a distance which is less than the thickness of the filter cake which builds up on said surface of said filter plate;

members on said screen means for receipt of longitudinal rods;

at least one eccentric longitudinal rod operably connected to such member on each side of said screen means;

motive means for rotating said eccentric rods, whereupon said screen means are oscillated;

said screen means being effective upon oscillation to dislodge filter cake from said filter plate, but being effective at other times to retain filter cake on said filter plate.

5. Apparatus for use in filtering fluids which comprises in combination with a filter tank and at least one vertical filter plate having a filtering media, disposed in said filter tank:

porous screen means adjacent said filter plate, said screen means covering substantially the complete effective filtration area of said filter plate and said screen being laterally spaced from the surface of said filter plate by a distance which is less than the thickness of the filter cake which builds up on said surface of said filter plate;

means on said screen means for receipt of oscillating means;

oscillating means which may be selectively oscillated when desired to oscillate said screen means;

washing means for ejecting a suitable cleansing fluid upon said filter plate simultaneously with oscillation of said screen; and means for introducing a compressed gas into the interior of said filter plate to expand the filtering media of said filter plate outwardly toward engagement of said filtering media with said screen means, simultaneously with oscillation of said screen, said screen means being effective upon oscillation to dislodge filter cake from said filter plate, but being effective at other times to retain filter cake on said filter plate, and said screen means, said washing means and said means for introducing gas being effective in combination to obtain complete and efficient cleaning of said filter plate without damage to said filtering media.

6. Apparatus in accordance with claim 5, wherein said retaining means comprises a frame and an expanded metal screen affixed to said frame around the periphery thereof, and wherein said means for receipt of said oscillating means comprise bracket members affixed to each side of said frame.

7. Apparatus in accordance with claim 5, wherein said oscillating means comprise eccentric longitudinal rods driven by motive means.

8. A method of dislodging a filter cake from a vertical filter plate in a filter tank said filter plate having a filtering media comprising:

providing a porous screen and means for oscillating said screen;

positioning said screen adjacent said filter plate so that the distance there-between is less than the desired thickness of the filter cake on said filter plate;

oscillating said screen to remove the greatest portion of said filter cake;

continuing oscillation of said screen while at the same time expanding the filtering media of said filter plate toward engagement with said screen, and ejecting a stream of cleansing fluid onto said media, thereby to completely and efficiently clean said filtering media and prepare it for further filtration.

* * * * *